United States Patent [19]

Fürst et al.

[11] Patent Number: 4,570,992
[45] Date of Patent: Feb. 18, 1986

[54] TILT-OUT ROOF FOR VEHICLES

[75] Inventors: Arpad Fürst, Munich; Richard Igel, Germering, both of Fed. Rep. of Germany

[73] Assignee: Webasto-Werk W. Baier GmbH & Co., Fed. Rep. of Germany

[21] Appl. No.: 611,942

[22] Filed: May 18, 1984

[30] Foreign Application Priority Data

Jul. 9, 1983 [DE] Fed. Rep. of Germany ....... 3324838

[51] Int. Cl.⁴ .............................................. B60J 7/08
[52] U.S. Cl. .................................. 296/223; 296/218;
292/8; 292/277; 292/278; 292/DIG. 5
[58] Field of Search ............... 296/223, 224, 216, 218;
49/394; 292/8, 31, DIG. 5, 262, 277, 278

[56] References Cited

U.S. PATENT DOCUMENTS

| | | | |
|---|---|---|---|
| 4,219,231 | 8/1980 | Igel | 296/218 |
| 4,219,232 | 8/1980 | Kouth | 296/223 |
| 4,390,203 | 6/1983 | Lutz et al. | 296/223 |

*Primary Examiner*—Robert R. Song
*Attorney, Agent, or Firm*—Sixbey, Friedman & Leedom

[57] ABSTRACT

A tilt-out roof for vehicles having a closure panel arranged in the area of an opening in the roof of the vehicle. A frame extends around the edge of the opening in the roof, and a telescopic jack, that is used for the lifting and lowering of the rear part of the cover, is connected to the frame, on the one hand, and to the closure panel, on the other hand. The telescopic jack has several threaded parts that engage with one another, one of which is connected with a turning handle. The turning handle has a rotary plate that establishes the connection with one threaded part and closes the telescopic jack toward the bottom, and a separate handle rim that is detachably connected with the rotary plate. The rotary plate acts to hold the threaded parts of the jack in a predetermined relationship with respect to one another when the handle rim is detached.

18 Claims, 7 Drawing Figures

FIG. 6
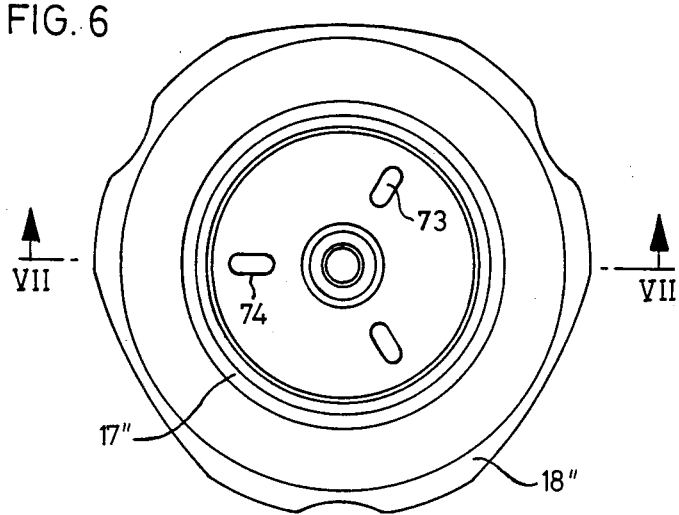
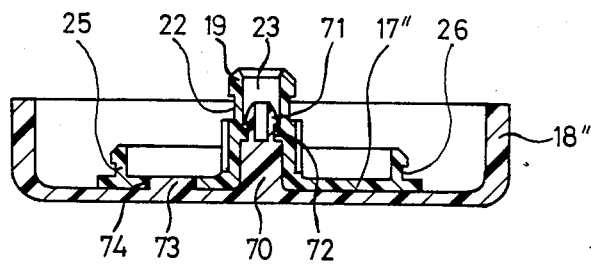
FIG. 7

TILT-OUT ROOF FOR VEHICLES

BACKGROUND AND SUMMARY OF THE INVENTION

This invention relates to a roof for vehicles of the type having an outwardly tiltable closure panel which is raised and lowered by a telescopic screw-type jack.

Tilt-out roofs of this type are known (U.S. Pat. Nos. 4,142,761; 4,219,231; and 4,428,614; as well as copending, commonly assigned U.S. application Ser. No. 416,160, filed Sept. 9, 1982). The telescopic jack of such tilt-out roofs is furnished by itself or, especially in the case of tilt-out roofs intended for retrofit installation, together with the frame and a gripping bowl, in pre-assembled condition. However, for installation, it is necessary to temporarily remove the turning handle and the gripping bowl in order to be able to insert, from above, the telescopic jack into the frame or, in the case of a lifting roof for a retrofit installation, the roof including the frame, without the turning handle and/or the gripping bow being in the way. However, after the turning handle is removed, undesired and uncontrolled mutual shifting of the threaded parts of the telescopic jack may occur in the case of the known arrangements. These parts must then be adjusted with respect to one another before the turning handle is mounted again.

The invention, therefore, has an object of eliminating these disadvantages and of improving the known tilt-out roof of the vehicle in such a way that uncontrolled mutual movements of the threaded parts of the telescopic jack are avoided during the installation.

According to preferred embodiments of the invention, this object is achieved by the fact that the turning handle has a rotary plate establishing the connection to one threaded part and closing the telescopic jack toward the bottom, as well as a separate handle rim that is detachably connected with the rotary plate. The turning handle is, therefore, constructed in two parts. The rotary plate forms a securing means which, when the handle rim is removed, holds the threaded parts of the telescopic jack in a predetermined position with respect to one another. The tilt-out roof can, therefore, be built as a pre-assembled unit and retrofit installed, as a whole, into a vehicle, while the handle rim is removed. Then, the gripping bowl and the handle rim, which may interfere with the mentioned assembly or installation, can be fitted without the requirement of a previous cumbersome mutual alignment of the threaded parts of the telescopic jack.

In cases where at least the lower part of the telescopic jack is laterally enclosed by an essentially collar-shaped housing part, the rotary plate is preferably in the area of its outer circumference supported rotatably at this housing part. So that the rotary plate itself does not have a disturbing effect during the assembly or installation, its exterior dimensions are expediently equal to or smaller than the exterior dimensions of the housing part in a plane that is normal with respect to the axis of the telescopic jack. For reasons of stability, the handle rim is preferably cap-shaped, and the bottom of the handle rim is held so that it rests against the bottom side of the rotary plate. The connection of the handle rim and the rotary plate may be carried out in any arbitrary manner, especially by clipping-on or by means of at least one screw. In order to obtain a large lever arm, catches are provided at a distance from the axis for transferring the torque from the handle rim to the rotary plate. These may expediently be molded onto the handle rim or the rotary plate in the form of projections which engage in matching indentations or recesses of the rotary plate or of the handle rim.

These and further objects, features and advantages of the present invention will become more obvious from the following description when taken in connection with the accompanying drawings which show, for purposes of illustration only, several embodiments in accordance with the present invention.

BRIEF DESCRIPTION OF THE DRAWINGS

FIG. 6 shows a top view of the structural components consisting of the rotary plate and the handle rim according to another embodiment and seen from the side that is on top in FIG. 7; and FIG. 7 shows a section along Line VII—VII of FIG. 6.

DETAILED DESCRIPTION OF THE PREFERRED EMBODIMENTS

Figure 1:
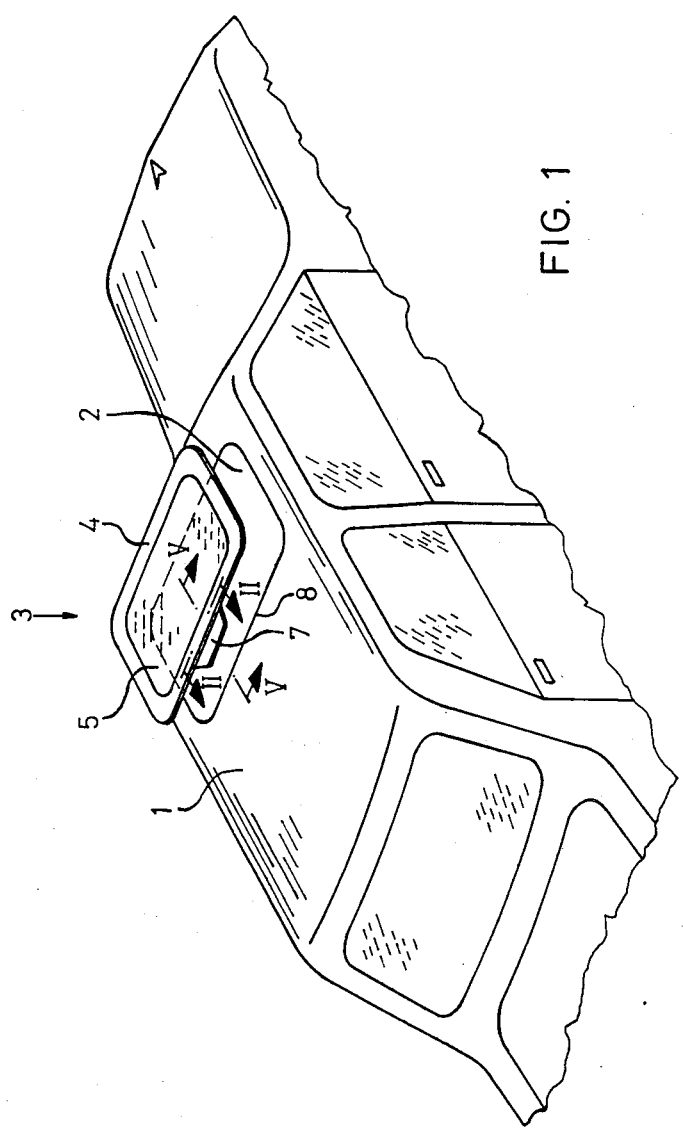
FIG. 1 shows a diagram of a motor vehicle having an opening in the roof and a lifting roof prior to retrofit installation.

With reference to FIG. 1, a rectangular opening 2 in the roof is provided in the stationary part 1 of a roof of a motor vehicle, into which a tilt-out roof assembly is to be inserted. Part of the tilt-out roof assembly, which is referenced generally by the numeral 3, is a frame 4 which may, for example, be manufactured of aluminum and a closure panel 5 which may, for example, consist of acrylic glass or metal. The closure panel 5 is linked to the front part of the frame 4 and can be tilted about an axis in the proximity of its front edge. For this purpose, hinges may be provided or may be formed by plug-in elements of the closure panel 5 that can be inserted in receiving means on the frame, as is known, per se (for example, from the above-mentioned Ser. No. 416,160 and U.S. Pat. No. 4,118,063).

For the lifting and lowering of the rear part of the cover 5, a lifting device with a telescopic jack, as will be described in detail by means of FIG. 2, that includes a rotatable knob-type handle 6 and a gripping bowl 7. As shown in FIG. 1, the gripping bowl 7, with its rear part, projects beyond the rear edge 8 of the opening 2 in the roof. It is, therefore, impossible to insert the tilt-out roof assembly 3 with the completely assembled gripping bowl 7 into the opening 2 in the roof vertically from above. However, insertion of the assembly in a vertical direction is often necessary, in practice, for various reasons.

Figure 2:
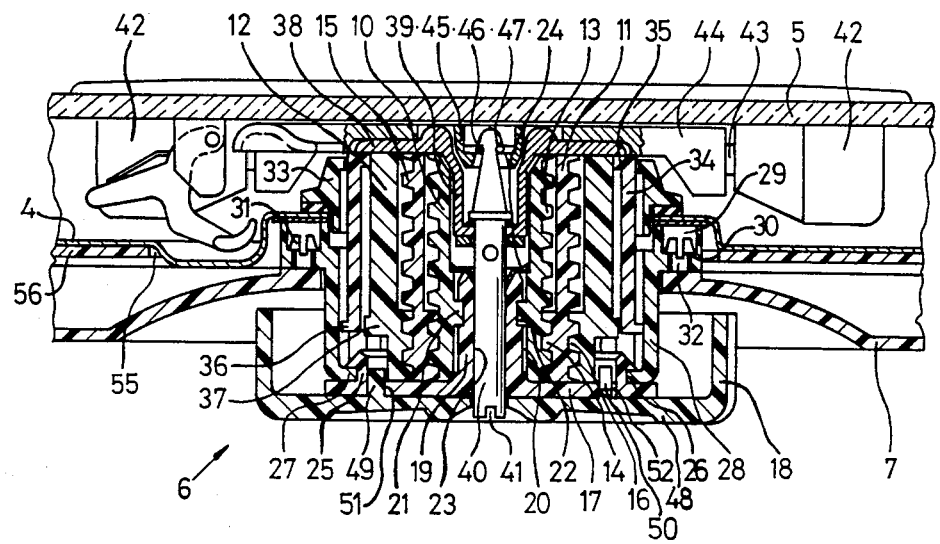
FIG. 2 shows a partial section along Line II—II of FIG. 1, when the cover is in a closed position.

Referring now to FIG. 2, the lifting device has a telescopic jack consisting of an inside threaded part 10, an intermediate threaded part 11 and an outside threaded part 12. The threaded part 10 has an external thread 13, into which an internal thread 14 of the intermediate threaded part 11 engages. The intermediate threaded part 11 also has an external thread 15 that engages in an internal thread 16 of the threaded part 12. The turning handle 6 consists of a rotary plate 17 and a knob-like handle rim 18 that is detachably connected with it. The rotary plate 17 has a hub 19 that is slotted in an axial direction, and has splines 20 for creating a connection with the internal threaded part 10, which will prevent relative rotation therebetween. A ridge 21 of the threaded part 10 projects inwardly into a ring groove 22 of the hub 19 in order to establish a mutual connection of the rotary plate 17 and the threaded part 10, preventing relative movement in the axial direction. The hub 19 has a central borehole 23 which widens conically at its upper end. A spring washer 24 rests against the internal wall of the threaded part 10 with its external edge, and, with its conically-shaped internal edge, spreads the parts of the slotted hub 19 outwardly.

A ridge 25 of rotary plate 17, that is concentric with respect to the hub 19, has an external ring groove 26 into which a ring-shaped, inwardly directed, projection 27 of a housing part 28 is located with play. The housing part 28 has several, for example, four, recesses 29 distributed at the circumference, the recesses 29 having shoulders 30, against which widened heads 31 of slotted connecting elements 32 are placed, which, themselves, are part of the gripping bowl 7. A cover member 33 is inserted from the upper side of the frame 4. Screws that are not shown and that engage in boreholes of the housing part 28 and reach through boreholes in the frame 4, in a known manner (U.S. Pat. No. 4,428,614), connect the housing part 28 and the covering 33 with the frame 4. In a space that is delimited by the housing part 28, the covering 33 and the threaded part 12, a collar 34 is guided that has a rectangular cross section. In the area of its upper end, on opposite sides, the collar 34 has two ridges 35, pointing toward the inside, whereas, in the area of the lower end of the collar, two flange parts 36 project toward the outside. The collar 34 can be moved between the inserted position shown in FIG. 2 and a position in which the flange parts 36 rest against the covering 33, while the threaded part 12, that is prevented from rotating by the engagement with the shell 34, can be moved upward until ridges 37 of the threaded part 12, that project toward the outside, strike against the ridges 35 of the collar 34.

A plate 38 is screwed to the external threaded part 12 and has a hub 39 reaching into the inside space of the threaded part 10. A pin 40 is rotatably disposed in the hub 39 which, at its lower end, is provided with a slot 41. In the closed position of the cover 5, the slotted lower end of the pin projects out of the hub 19 and, thus, becomes accessible for the purpose of being operated by means of a coin or similar object. In the area of its rear edge, the cover 5 has two bearing blocks 42 into which one bearing journal 43 each is inserted. The bearing journals 43 reach into the boreholes of a bridge 44 in order to fasten the bridge 44 so that it can be swivelled around an axis at the cover 5 that is vertical to the longitudinal direction of the vehicle. In its central part, the bridge 44 is equipped with a projection 45 that points downward, in which a catch spring 46 is located, the legs of which normally reach under shoulders 47 at the upper end of the pin 40. In this manner, the tilt-out device is connected with the cover 5. By means of the rotation of the pin 40, the catch spring 46 is spread out and released from the shoulders 47, so that the cover 5 can be removed in a manner that is known, in detail, on the basis of U.S. Pat. No. 4,428,614.

Figure 3:
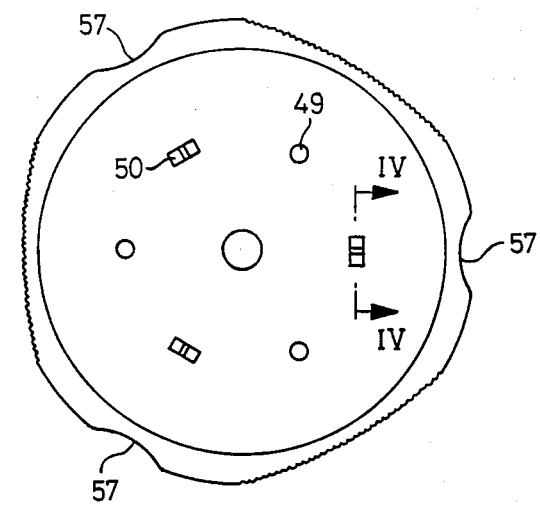
FIG. 3 shows a top view of the handle rim from the side that is on top in FIG. 2.
Figure 4:
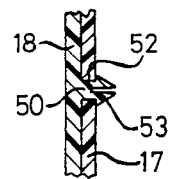
FIG. 4, at a larger scale, shows a partial section along Line IV—IV of FIG. 3.

As also shown in FIG. 2, the outside dimensions of the rotary plate 17, in a plane that is perpendicular with respect to the axis of the rotary spindle, is essentially equal to the outside dimensions of the housing part 28. The handle rim 18 is constructed to be cap-shaped and has a bottom 48 with which it rests against the bottom side of the rotary plate 17. With reference to FIG. 3, three catches 49 projecting upward and three slotted clips 50 are molded onto the bottom 48. The catches 49 engage in recesses 51 of the rotary plate 17 that are away from its center axis and are used for the transmission of the torque from the handle rim 18 to the rotary plate 17. In a similar manner, the clips 50 reach through recesses 52 of the rotary plate 17 and, in the process, engage against the top side of the rotary plate 17, by means of shoulders 53, in order to pull the bottom of the handle rim 18 against the bottom side of the rotary plate 17.

Figure 5:
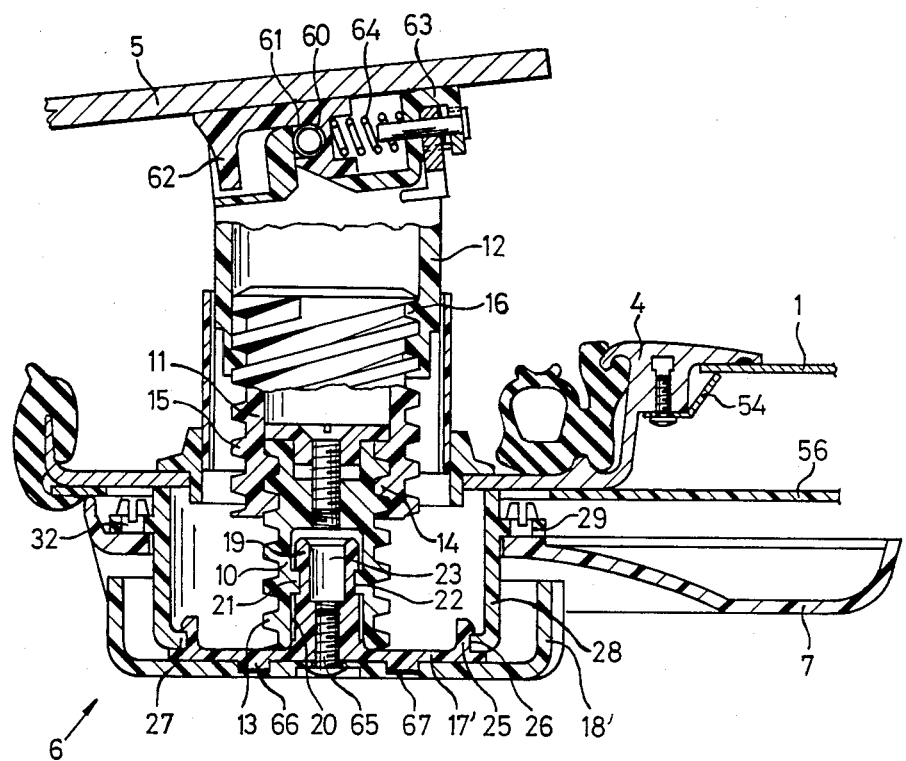
FIG. 5 shows a partial section of a modified embodiment of the lifting roof, when the closure panel is tilted out, along Line V—V of FIG. 1.

The tilt-out roof assembly 3, intended for a retrofit installation, is expediently completely pre-assembled, except for the gripping bowl 7 being fitted and without the handle rim 18 being connected with the rotary plate 17. In this manner, the tilt-out roof assembly 3 can be inserted into the opening 2 of the roof, vertically from above, without any problems, and can be fixed to the stationary part 1 of the roof, for example, by means of clamping strips, as shown in FIG. 5 at 54, and as is known from the noted Ser. No. 416,160. Without the handle rim 18 and without the gripping bowl 7, when the lifting roof 3 is inserted, none of its parts will hit the rear edge 8 of the opening 2 in the roof, and the housing part 28, without problems, can pass through a prepared aperture 55 of a stationary inside roof lining 56. During the transport and the assembly with rim 18 detached, the rotary plate 17 acts as a securing means that holds the threaded parts 10, 11, 12 in a predetermined relative position, as shown in FIG. 2, in which the threaded parts, with their lower front surfaces, sit on the rotary plate 17. After installation, the gripping bowl 7 can be pushed over the housing part 28, that projects downward, from below, and can, by means of the clip-type connecting elements 32, be fixed to the housing part 28. Finally, the handle rim 18 is simply pressed from below against the rotary plate 17, in which case, the catches 49 and the clips 50 snap into the recesses 51 and 52. The handle rim 18 will automatically assume a predetermined angular position with respect to the tilt-out roof assembly 3 that is also in a predetermined position, namely, in the closed position. This is desirable in order to, for example, have the handle grooves 57 of the handle rim 18, when the lifting roof 3 is closed, always aligned in the predetermined manner.

In the case of the modified embodiment according to FIG. 5, the outer threaded part 12, for the purpose of a swivellable and detachable connection of the threaded spindle with the cover 5, has two diametrically projecting pins 60, which each may snap into a groove 61 of a manually operable locking bolt 62. The locking bolt 62 is connected with the cover 5 via a bearing housing 63. It can be pressed back against the effect of a spring 64 in order to release the pin 60. In the case of this type of connection of the tilt-out device and the cover 5 (which is known, per se, from U.S. Pat. No. 4,219,231), there is no pin 40. The central borehole 28 of the rotary plate 17' is, therefore, available for receiving a central fastening screw 65, which holds the bottom of the handle rim 18' against the bottom side of the rotary plate 17'. For the transmission of the torque between the handle rim and the rotary plate, dogs 66 are molded onto the bottom side of the rotary plate 17' which engage in recesses 67 of the handle rim 18.

According to a further modified embodiment illustrated in FIGS. 6 and 7, the handle rim 18" has a central hub 70 that has a divided clip 71. The clip 71 can snap into the central borehole 23 of the hub 19 behind the inner collar 72. Dogs 73 project upward from the bottom of the handle rim 18" for the purpose of transmitting torque from the handle rim 18" to the rotary plate 17", and engage in recesses 74 of the rotary plate 17".

The invention has been explained, above, by means of a lifting roof of the type intended for retrofit installation as a pre-assembled unit. However, naturally, it is not limited to that type of design and can, in the same manner, also be used for lifting roofs, the frame for which, corresponding in regard to function to the frame 4, is firmly connected with the stationary part 1 of the roof prior to installation, such as by having been part of the original vehicle equipment.

The discussion relative to "retrofit installation", above, also applies to the use of a pre-assembled unit within the framework of series production of motor vehicles on a conveyor line.

While we have shown and described various embodiments in accordance with the present invention, it is understood that the same is not limited thereto, but is susceptible of numerous changes and modifications as known to those skilled in the art, and we, therefore, do not wish to be limited to the details shown and described herein, but intend to cover all such changes and modifications as are encompassed by the scope of the appended claims.

We claim:

1. A tilt-out roof for vehicles having a closure panel arranged in the area of an opening in a vehicle roof, a frame that extends around an edge of the roof defining said opening, and a telescopic jack for the lifting and lowering of a rear part of the closure panel relative to said frame, said jack being connected between the frame and the closure panel and having several threaded parts that engage with one another so as to be movable with respect to the frame by operation of a turning handle connected thereto, wherein the turning handle has a rotary plate connected to the telescopic jack and a handle rim that is detachably connected to the rotary plate, and wherein the connection of the rotary plate to the telescopic jack enables the rotary plate to form a securing means for holding the threaded parts of the telescopic jack in a predetermined position with respect to one another when the handle rim is removed.

2. A tilt-out roof according to claim 1, wherein the telescopic jack, at its lower end, is received within an essentially collar-shaped housing; and wherein the rotary plate, in the area of its outer circumference, is rotatably supported by a housing part of the telescopic jack.

3. A tilt-out roof according to claim 2, wherein the circumference of the rotary plate is equal to or smaller than the circumference of the housing part of the jack in a plane that is normal to the longitudinal axis of the telescopic jack.

4. A tilt-out roof according to claim 3, wherein the handle rim is cap-shaped, and a bottom of the cap-shape of the handle rim is engageable against the bottom side of the rotary plate.

5. A tilt-out roof according to claim 1, wherein the handle rim is cap-shaped, and a bottom of the cap-shape of the handle rim is engageable against the bottom side of the rotary plate.

6. A tilt-out roof according to claim 2, wherein the handle rim is cap-shaped, and a bottom of the cap-shape of the handle rim is engageable against the bottom side of the rotary plate.

7. A tilt-out roof according to claim 6, wherein the handle rim is clipped to the rotary plate.

8. A tilt-out roof according to claim 4, wherein the handle rim is clipped to the rotary plate.

9. A tilt-out roof according to claim 5, wherein the handle rim is clipped to the rotary plate.

10. A tilt-out roof according to claim 4, wherein the handle rim is connected with the rotary plate by means of at least one fastening screw.

11. A tilt-out roof according to claim 5, wherein the handle rim is connected with the rotary plate by means of at least one fastening screw.

12. A tilt-out roof according to claim 6, wherein the handle rim is connected with the rotary plate by means of at least one fastening screw.

13. A tilt-out roof according to claim 4, wherein, for the transfer of the torque from the handle rim to the rotary plate, catches are provided at a distance from the axis of rotation of the turning handle.

14. A tilt-out roof according to claim 5, wherein, for the transfer of the torque from the handle rim to the rotary plate, catches are provided at a distance from the axis of rotation of the turning handle.

15. A tilt-out roof according to claim 6, wherein, for the transfer of the torque from the handle rim to the rotary plate, catches are provided at a distance from the axis of rotation of the turning handle.

16. A tilt-out roof according to claim 15, wherein the catches are molded onto one of the handle rim and the rotary plate in the shape of projections which engage in matching indentations or recesses of the other of the rotary plate and the handle rim.

17. A tilt-out roof according to claim 13, wherein the catches are molded onto one of the handle rim and the rotary plate in the shape of projections which engage in matching indentations or recesses of the other of the rotary plate and the handle rim.

18. A tilt-out roof according to claim 14, wherein the catches are molded onto one of the handle rim and the rotary plate in the shape of projections which engage in matching indentations or recesses of the other of the rotary plate and the handle rim.

* * * * *